(12) United States Patent
van den Berg

(10) Patent No.: US 6,205,949 B1
(45) Date of Patent: Mar. 27, 2001

(54) METHOD OF MILKING ANIMALS

(75) Inventor: Karel van den Berg, Bleskensgraaf (NL)

(73) Assignee: Maasland N.V. A Dutch Company, Netherlands (NL)

( * ) Notice: Subject to any disclaimer, the term of this patent is extended or adjusted under 35 U.S.C. 154(b) by 0 days.

(21) Appl. No.: 09/169,151

(22) Filed: Oct. 9, 1998

Related U.S. Application Data

(63) Continuation of application No. PCT/NL98/00087, filed on Feb. 11, 1998.

(30) Foreign Application Priority Data

Feb. 12, 1997 (NL) .................................................. 1005255

(51) Int. Cl.⁷ .............................. A01J 5/003; A01J 5/017
(52) U.S. Cl. ................................. 119/14.02; 119/14.03; 119/14.08
(58) Field of Search .............................. 119/14.02, 14.08, 119/14.03, 14.47, 14.54, 14.14

(56) References Cited

U.S. PATENT DOCUMENTS

| | | | |
|---|---|---|---|
| 3,792,686 | * | 2/1974 | Needham et al. ................. 119/14.03 |
| 4,401,055 | * | 8/1983 | Street et al. ....................... 119/14.03 |
| 4,941,433 | * | 7/1990 | Hanauer ............................. 119/14.02 |
| 5,195,455 | * | 3/1993 | Lely et al. ......................... 119/14.03 |
| 5,469,808 | * | 11/1995 | Street et al. ........................... 119/520 |
| 5,791,284 | * | 8/1998 | Lely ................................... 119/14.08 |

FOREIGN PATENT DOCUMENTS

3931769 A1 * 4/1991 (DE) .

* cited by examiner

Primary Examiner—Peter M. Poon
Assistant Examiner—Yvonne R. Abbott
(74) Attorney, Agent, or Firm—Penrose Lucas Albright

(57) ABSTRACT

A method and apparatus for milking animals, particularly goats, wherein the animals are arranged side by side in two rows of milking compartments in a milking parlor. A robot arm construction is provided which is moved along the rear of the animals in the milking compartments of each row. Teat cups are provided behind each of the milking compartments which are retained in holders by a tension mechanism. A pair of rails are provided behind each row of milking compartments along which the robot arm constructions move supported via rollers which engage the rails. Each robot arm construction has an acquiring mechanism for grasping individually the teat cups and moving them forward and aft, pivoting them about a vertical pivot axis, and raising and lowering them. Each acquiring mechanism includes a sensor which is active between the hind legs of an animal in the milking compartment involved for locating the animal's teats and providing guidance for connecting the teat cups to the animal's teats from between the hind legs of the animals. The forward aspect of each milking compartment has a feeding trough on a partition which is movable and functions as an exit from the milking compartment.

25 Claims, 2 Drawing Sheets

METHOD OF MILKING ANIMALS

RELATED APPLICATION

This Application is a continuation of International Application No. PCT/NL98/00087, filed Feb. 11, 1998.

FIELD OF THE INVENTION

The present invention relates to an apparatus and a method of milking animals, in particular goats, wherein the animals are arranged side by side in a milking parlor.

BACKGROUND OF THE INVENTION

There is a known method of automatically milking cows which are arranged behind each other in milking compartments that are adjacent to each other in longitudinal direction. A robot arm construction is movable in longitudinal direction along the milking compartments, by means of which robot arm construction for each milking compartment, teat cups can be acquired and positioned under the udder of an animal, whereafter the teat cups can be connected one by one to the teats of the animal.

In particular for milking goats this method is rather time-consuming. The production time of the robot arm construction is defined by the cleaning of the teats and the connection of teat cups to the teats of animals. Each robot arm construction serves two or at the most three milking compartments positioned behind each other in longitudinal directions.

SUMMARY OF THE INVENTION

In order to make the method suitable for milking goats, the method according to the invention is characterized by the steps of bringing about a movement from a robot arm construction along the rear of the animals or vice versa in order to position consecutively the animals to be milked; consecutively connecting teat cups to the teats of an animal positioned to be milked. More in particular, the robot arm construction is moved along the rear of the animals or that the section of the milking parlor where the animals are arranged is moved along the front of the robot arm construction for the purpose of consecutively acquiring teat cups which are provided behind each of the animals arranged in the milking parlor and connecting same to the teats of the animals. In other words, it is not only possible to dispose the robot arm construction movably along the rear of the animals, but the animals may also be arranged in a movable carrousel which moves them along a rigidly disposed robot arm construction. In this manner, ten, twenty or even more goats can be arranged side by side, while, with the aid of the robot arm construction, teat cups can be connected consecutively to the teats of the goats. In this method, the position of the teats can be determined by means of a detector which sends its radiation between the hind legs to the udder of the animals. This detector is preferably fitted to the robot arm construction itself, more in particular at such a level that, when the robot arm construction is moved along the rear of the animals, the detector is capable of observing the two teats of the goats. Also the teat cups are connected to the teats between the hind legs of the animals.

In addition to a method of milking animals, the invention also relates to an apparatus for milking animals, in particular goats, in which the aforementioned method can be applied. In accordance with the invention, this apparatus is provided with a milking parlor in which the animals can be arranged side by side and a robot arm construction which is movable along the rear of the animals is arranged in the milking parlor, to which robot arm construction are connected acquiring means for grasping teat cups provided behind each of the animals arranged in the milking parlor and for connecting same to the teats of the animals. The acquiring means can be connected in particular with the robot arm construction so as to be pivotable about a pivotal axis and be movable in height under the animal's udder. In this situation, it is possible for the pivotal axis for the acquiring means to extend horizontally at or near the upper side of the milking parlor in the longitudinal direction thereof, i.e., along the rear of the animals arranged side by side or above same. According to the invention, the movement of the robot arm construction in the longitudinal direction of the milking parlor can be obtained by providing the robot arm construction with a support unit which is movable in the longitudinal direction of the milking parlor along one or more rails, relative to which support unit the pivotable portion of the robot arm construction is pivotable in sideward direction Y and consequently in forward and rearward direction relative to the animals arranged in the milking parlor. The support unit may be designed so as to be movable along the rails by a motor drive. The sideward pivoting movement can be provided by means of an operating piston and cylinder which is active between the support unit and the pivotable portion of the robot arm construction. By designing the pivotable portion of the robot arm construction as a substantially downwardly extending carrier for the acquiring means, it will be possible, by disposing an operating piston and cylinder between the carrier and the acquiring means, to provide movability of the acquiring means in height.

In a specific embodiment, the acquiring means can additionally be connected with the robot arm construction so as to be rotatable about a substantially vertical pivotal axis. For the purpose of being able to determine the position of the teats of the animals, the acquiring means may be provided with a detector for determining the positions of the teats. In this situation the detector is fastened to the acquiring means at such a level that, when the robot arm construction with the acquiring means is moved along the rear of the animals, the detector is able to sense the positions of the teats. Because the teats of the animals, in particular in the case of a full udder, may rather often be orientated outwardly, it is of importance that the acquiring means are provided with a gripping element that is pivotable about a substantially horizontal axis, so that, when by means of the gripping element a teat cup has been grasped and brought to under the udder of the animal, the teat cup can be tilted so it can easily be connected to a teat which is orientated somewhat outwardly. As already mentioned, the acquiring means are capable of grasping the teat cups provided behind each of the animals in the milking parlor. In this situation it is advantageous that the teat cups be supported under tension in a holder behind each of the animals arranged in the milking parlor. Each teat cup is capable of individually being taken from the holder and being connected to a teat of an animal present in the milking parlor. Preferably, each teat cup is additionally provided with withdrawing means for the purpose of being withdrawn into the holder after the milk flow has at least almost finished.

For the purpose of arranging the animals properly side by side in the milking parlor, in accordance with the invention the apparatus comprises turnstiles to be operated by the animals themselves, functioning such that, each time when an animal occupies a milking compartment, a partition for a next animal is being formed. Each milking compartment is preferably provided at its front side with a movable feed trough. This feed trough may be designed so as to be pivotable in upward direction, thus being able to constitute an exit of the milking compartment, which exit is released when the feed trough is pivoted upwards.

BRIEF DESCRIPTION OF THE DRAWINGS

For a better understanding of the invention, reference will now be made to the accompanying drawings, in which.

Corresponding parts in the drawings are indicated by the same reference numerals.

DETAILED DESCRIPTION OF THE PREFERRED EMBODIMENTS

Figure 1:
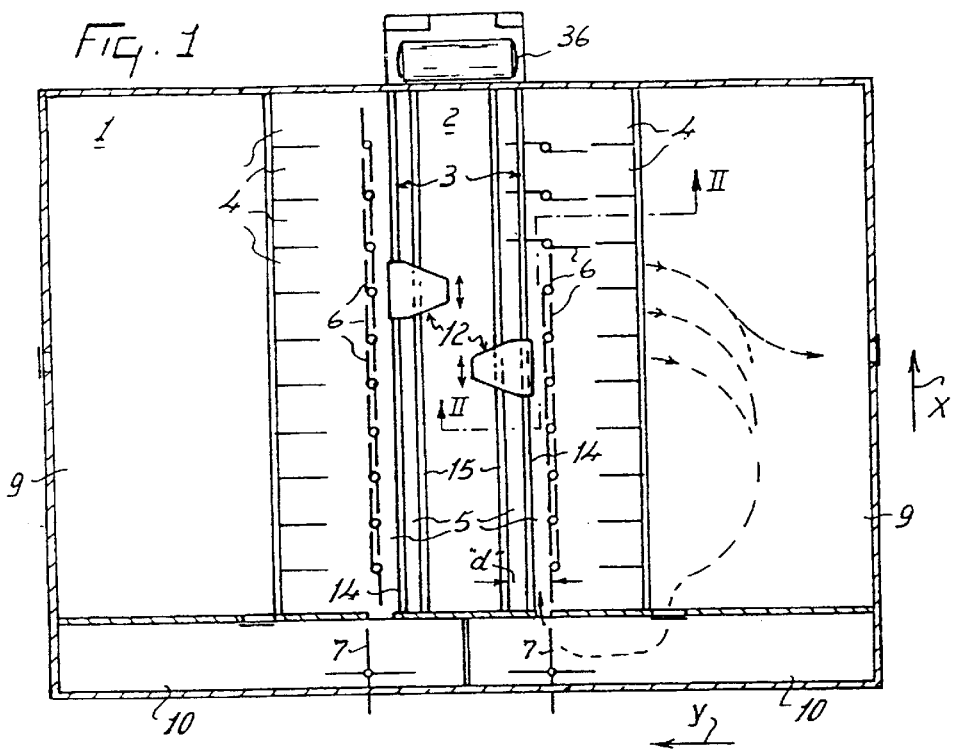
FIG. 1 shows schematically a plan view of a milking parlor in which goats can be arranged in two opposite rows.
Figure 2:
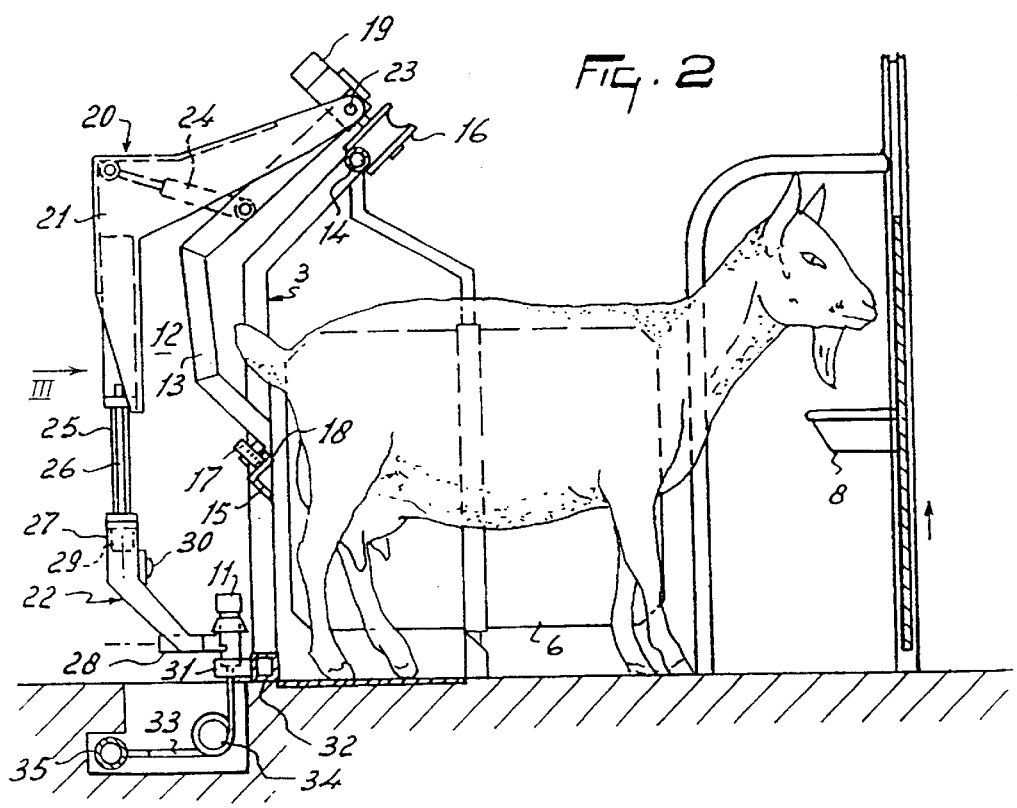
FIG. 2 shows a cross-section taken on the line II—II in FIG. 1 of a milking compartment for a goat and therebehind the robot arm construction according to the invention.
Figure 3:
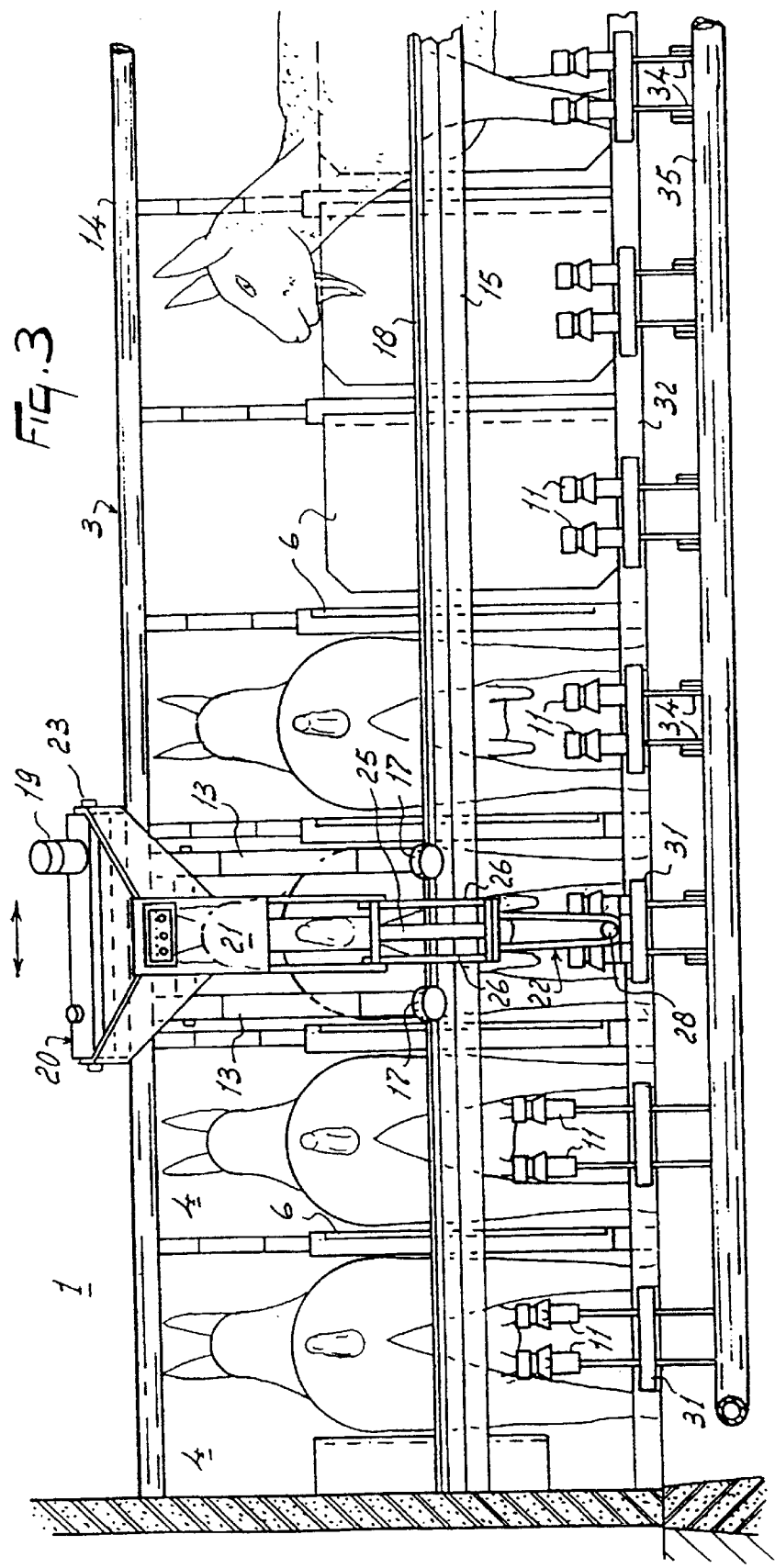
FIG. 3 shows in a rear view a number of goats arranged side by side and the robot arm construction positioned behind one of these goats.

The milking compartment 1 shown in FIG. 1 accommodates two rows of goats arranged side by side, which rows are separated by an alley 2 confined on both sides by a framework 3. On both sides of alley 2 there are provided compartments for the goats. These compartments are indicated by reference numerals 4. Compartments 4 are accessible to the goats via walking passages 5, the width of each being designated by "d". Each said walking passage is confined at one side by a framework 3 and at the other side by turnstiles 6. When a goat reaches the rearmost still available compartment via a walking passage 5 and enters this compartment, then the goat makes turnstile 6 rotate, i.e., into a position in which it forms a partition relative to the adjacent compartment. In FIG. 1 turnstiles 6 of the rearmost three compartments of the right hand row of compartments are rotated into positions in which they form partitions between the compartments; the remaining turnstiles are in the position of rest, i.e., they extend parallel to the relevant walking passage 5. When a goat leaves a compartment, the corresponding turnstile 6 reassumes the position in which it extends parallel to the relevant walking passage 5. At the entrance of each walking passage 5 there is provided a further turnstile 7 which comprises a counter for the purpose of admitting into the associated walking passage 5 a number of goats corresponding to the number of compartments 6. Each compartment is provided with a feed trough 8 at its front side, i.e., the side to which the head of a goat is directed when the latter is present in a compartment. The front side of each of the compartments including feed trough 8 is capable of being pivoted open or being pivoted or slid upwardly in such a manner that, by releasing the front side of a compartment, a goat is allowed to leave this compartment. As shown in FIG. 1, the goats are then admitted into a section 9 from which they may go outside, if desired, or be led back, via a walking passage 10 and the associated turnstile 7, to a walking passage 5 and subsequently to compartments 4.

In compartments 4 the goats are milked. To this end behind each compartment, immediately behind each framework 3 in alley 2, there are arranged two teat cups 11 which can be grasped by a robot arm construction 12 and connected to the two teats of the goats. FIG. 1 shows two of such robot arm constructions 12. However, in what follows only one of the two robot arm constructions will be described in further detail.

Robot arm construction 12 is movable along the rear side of compartments 4. To this end, robot arm construction 12 comprises a support unit 13 which is movable along rails 14 and 15. Rail 14 is tube-like and disposed above a milking compartment in milking parlor 1 in the longitudinal direction X thereof while being supported by a framework 3 and the frames of turnstiles 6. Rail 15 is fitted to framework 3 at approximately one-half the height of the milking compartment. Rail 15 is constituted by an angle profile; the abutment face along which support unit 13 can be moved is located outside the milking compartment at an angle of approximately 45° obliquely downwards relative thereto. Both at its upper and under side support unit 13 comprises rollers 16 and 17. Rollers 16 and 17 are located perpendicular to each other and are retained on support unit 13 at an angle of approximately 45° relative to a vertical plane deposed in the longitudinal direction X of the milking parlor in such a manner that support unit 13 bears on rail 14 by means of rollers 16 and bears on rail 15 by means of rollers 17. In order to prevent support unit 13 from being dislodged from rollers 16 and 17, there are provided locking means in the form of an edge piece 18 fastened to roller 17 or in the form of additional rollers disposed diametrically opposite rollers 16 relative to rail 14, the latter extending consequently between the rollers. Support unit 13 is moved along rollers 16 and 17 by means of a motor 19.

Robot arm construction 12 is furthermore provided with a sidewardly pivotable portion 20 which comprises a substantially downwardly extending carrier 21 and acquiring or connecting means 22 fastened thereto. The sidewardly pivotable portion 20 and consequently also connecting means 22 are pivotable about a substantially horizontal pivotal shaft 23 which is located at or near the upper side of the milking parlor and extends in the longitudinal direction X thereof. Pivotal shaft 23 and the center line of rail 14 are located in a substantially vertical plane.

In the embodiment described thus far, the sideward pivotability of portion 20 is realized by means of an operating piston and cylinder unit 24 which is active between said pivotable portion 20 and support unit 13. As already mentioned, the sidewardly pivotable portion 20 comprises carrier 21 and connecting means 22. Connecting means 22 are connected with carrier 21 so as to be movable in height by means of an operating piston and cylinder element 25. Parallel to operating piston and cylinder element 25 are provided two guide rods 26.

Connecting means 22 comprise a portion 27, extending obliquely downwardly in the direction of the compartments, and a horizontal gripping element 28. By means of a motor 29 connecting means 22 are rotatable about a downwardly orientated axis relative to sidewardly pivotal portion 20, while gripping element 28 is connected, rotatably about a substantially horizontal axis, with obliquely downward extending portion 27 of connecting means 22. With the aid of connecting means 22 a teat cup 11 is connected to a teat of a goat. Because of the movability of gripping element 28, the teat cup which is gripped thereby can always be brought into a position or can always assume a position adapted to the orientation of the teats, so that the teat cups can always be connected to the teats. For the purpose of controlling connecting means 22 a detector 30 is fastened thereto, by means of which detector the position of the teats is determined. When an animal is present in the milking parlor and teat cups 11 are to be connected, by means of motor 19 robot arm construction 12 is first moved in the longitudinal direction X of the milking parlor, i.e., into a position in which connecting means 22 are pivoted entirely or almost entirely outside walking passage 5 for the goats, in such a manner that by means of the operating piston and cylinder unit 24, connecting means 22 is pivoted under the animal into a position in which it is possible for detector 30 to determine the position of the teats. After having been gripped, a teat cup can be connected to a teat by means of motor 29, operating piston and cylinder units 24 and elements 25. By moving sidewardly pivotable portion 20 towards a goat, detector 30 is able to observe the teats between the hind legs; naturally, for the purpose of being connected to the teats of a goat, also the teat cups are brought to under the udder of the goat between the hind legs.

In the position of rest, each of teat cups 11 is arranged in a holder 31 which is rigidly connected with a horizontal beam 32 extending immediately above the floor between lower beams of framework 3. Via an automatic rewinding device 34 a milk tube 33 is connected to a milking line 35 which, passing under the floor, is connected with a milk tank 36. By automatic rewinding device 34 teat cup 11 is maintained under tension in the holder. By the connecting means, a teat cup is connected to a teat against this tension. Because of the vacuum present in the teat, the teat cup remains connected to the teat. The tractive force exerted by the automatic rewinding device is small relative to the suction force effected by this vacuum. When, after milking, the vacuum in the teat cup is removed, the teat cup is immediately drawn into its holder by the automatic rewinding device.

Although I have described the preferred embodiments of my invention, it is to be understood that it is capable of other adaptations and modifications within the scope of the following claims.

Having disclosed my invention, what I claim as new and to be secured by Letters Patent of the United States of America is:

1. A method of milking animals, in which the animals are arranged side by side in a milking parlor, comprising the steps of:
    moving a robot arm construction along the rear of the animals to consecutively position the animals to be milked;
    consecutively detecting the position of each animal's teats while arranged side by side in said milking parlor by transmitting radiation from said robot arm construction between the hind legs of the relevant animal; and
    consecutively connecting teat cups to the teats of animals positioned to be milked.

2. A method of milking animals, in which the animals are arranged side by side in a milking parlor comprising moving a robot arm construction along the rear of the animals,
    consecutively detecting the position of each animal's teats while said animals are arranged side by side in said milking parlor by transmitting from said robot arm construction radiation between the legs of the relevant animal,
    consecutively acquiring teat cups provided behind each of the animals arranged in the milking parlor by said robot arm construction and connecting said teat cups to the teats of the animal by said robot arm construction.

3. A method in accordance with claim 2, wherein said teat cups are connected to the teats of the animals by said robot arm construction by moving said teat cups between the hind legs of the animals.

4. An apparatus for milking animals, comprising a milking parlor in which the animals can be arranged side by side, a robot arm construction which is movable along the rear of the animals arranged in the milking parlor, detector means on said robot arm which determines the locations of the animals' teats, while side by side in said milking parlor by transmitting a radiation which is reflected from the animal's teats, said robot arm construction including acquiring means for grasping teat cups which are provided behind each of the animals arranged in the milking parlor and connecting means guided by said detector means for connecting said teat cups to the teats of each animal, such teat cups being provided from behind each said by said connecting means.

5. An apparatus in accordance with claim 4, wherein said robot arm construction comprises a pivotal axis whereby said acquiring means is pivotable relative to the remainder of said robot arm construction about said pivotal axis, said robot arm construction further comprising elevating means whereby said acquiring means is vertically movable under the animal's udder.

6. An apparatus as claimed in claim 5, wherein said pivotal axis is disposed in the upper aspect of said robot arm construction and extends parallel to said robot arm construction's direction of movement along the rear of the animals arranged in said milking parlor.

7. An apparatus in accordance with claim 5, wherein said robot arm construction comprises a substantially downwardly extending carrier for said acquiring means, said carrier being pivotal about a pivot axis.

8. An apparatus in accordance with claim 7, wherein said elevating means interconnects said acquiring means and said carrier.

9. An apparatus in accordance with claim 8, further comprising a robot arm, said elevating means comprising a piston and cylinder element disposed between said robot arm and said carrier.

10. An apparatus in accordance with claim 7, wherein said pivot axis is substantially vertically disposed and said acquiring means is connected in said robot arm construction so as to be rotatable about said substantially vertical pivot axis.

11. An apparatus in accordance with claim 4, wherein said acquiring means is provided with a detector for determining the positions of the teats of an animal adjacent thereto.

12. An apparatus in accordance with claim 4, wherein said milking parlor comprises a plurality of side by side milking compartments, a holder for teat cups being disposed behind each said milking compartment, said holder being operatively associated with tension means for retaining a said teat cup by tension in said holder.

13. An apparatus in accordance with claim 12, wherein said milking parlor comprises a plurality of milking compartments in which said animals can be individually arranged side by side, said acquiring means performing the function of individually taking each teat cup from a said holder and connecting it to a teat of an animal present in the relevant said milking compartment.

14. An apparatus in accordance with claim 12, comprising withdrawing means for withdrawing a teat cup into said holder after milk flow into said teat cup is substantially completed, each said teat cup being provided with said withdrawing means.

15. A method of milking animals wherein the animals are arranged side by side in a milking parlor which comprises the steps of: moving a robot arm construction along the rear of the animals consecutively to position of the animals to be milked; consecutively connecting teat cups to the teats of animals so positioned to be milked; and detecting the position of each animal's teats by detector which transmits a radiation reflected by said teats between the hind legs to the udder of the relevant animal.

16. An Apparatus for milking animals comprising a milking parlor in which the animals are arranged side by side, a robot arm construction which is movable along the rear of the animals arranged in the milking parlor, said robot arm construction including acquiring means for grasping teat cups which are provided behind each of the animals arranged in the milking parlor and connecting means for connecting said teat cups to the teats of the animals, such teat cups being provided from behind the animals by said connecting means, said robot arm construction comprising a pivotal axis whereby said acquiring means is pivotal relative to the remainder of said robot arm construction about said pivotal axis, said robot arm construction further comprising elevating means whereby said acquiring means is vertical movable under each animal's udder, said pivotal axis being disposed in the upper aspect of said robot arm construction and extending parallel to said robot arm construction's direction of movement along the rear of the animals arranged in the said milking parlor, a rail and a support unit movable along said rail in a direction parallel to said pivotal axis, the portion of said robot arm construction which is pivotal about said pivotal axis being pivotal in a direction perpendicular to said pivotal axis as seen from above.

17. An apparatus in accordance with claim 16, comprising a second rail and a framework which is disposed in said milking parlor behind where said animals can be arranged side by side, said first mentioned rail and said second rail mounted at different levels on said framework to extend behind where said animals can be arranged side by side, said support unit being movable along said first mentioned rail and said second rail.

18. An apparatus in accordance with claim 17, comprising roller means disposed between said support unit on one hand and said first mentioned rail and said second rail on the other hand.

19. An apparatus in accordance with claim 16, comprising a motor drive for moving said support unit along said rail.

20. An apparatus in accordance with claim 16, comprising piston and cylinder means disposed between the pivotal portion of said robot arm construction and said support unit for pivoting the pivotal portion of said robot arm construction in a direction perpendicular to said pivotal axis as seen from above.

21. An apparatus for milking animals comprising a milking parlor in which the animals are arranged side by side, a robot arm construction which is movable along the rear of the animals arranged in said milking parlor, said robot arm construction including an acquiring means for grasping teat cups which are provided behind each of the animals arranged in the milking parlor, connecting means for connecting said teat cups to the teats of the animals being provided from behind the animals by said connecting means, and said acquiring means being provided with a gripping element for grasping a said teat cup, said gripping element being pivotal about a substantially horizontal axis.

22. An apparatus for milking animals comprising a milking parlor in which the animals are arranged side by side, a robot arm construction which is movable alone the rear of the animals arranged in the milking parlor, said robot arm construction including acquiring means for grasping teat cups which are provided behind each of the animals arranged in the milking parlor, connecting means for connecting said teat cups to the teats of the animals, such teat cups being provided from behind the animals by said connecting means, and a plurality of individual side by side milking compartments, each said milking compartment being provided with a turnstile means which functions so that when an animal occupies a said milking compartment, a partition is formed in the adjacent milking compartment.

23. An apparatus for milking animals comprising a milking parlor in which the animals to be milked are arranged side by side, a robot arm construction which is movable along the rear of the animals arranged in the milking parlor, said robot arm construction including acquiring means for grasping teat cups which are provided behind each of the animals arranged in the milking parlor, connecting means for connecting said teat cups to the teats of the animals, such teat cups being provided from behind the animals by said connecting means, and a plurality of side by side milking compartments for each animal to be milked, a movable feed trough being provided on the front of each of said milking compartments.

24. An apparatus in accordance with claim 23, comprising pivot means for pivoting said movable feed trough upwardly.

25. An apparatus in accordance with claim 24, wherein said movable feed trough comprises an exit from said milking compartment.

* * * * *